Patented Mar. 31, 1953

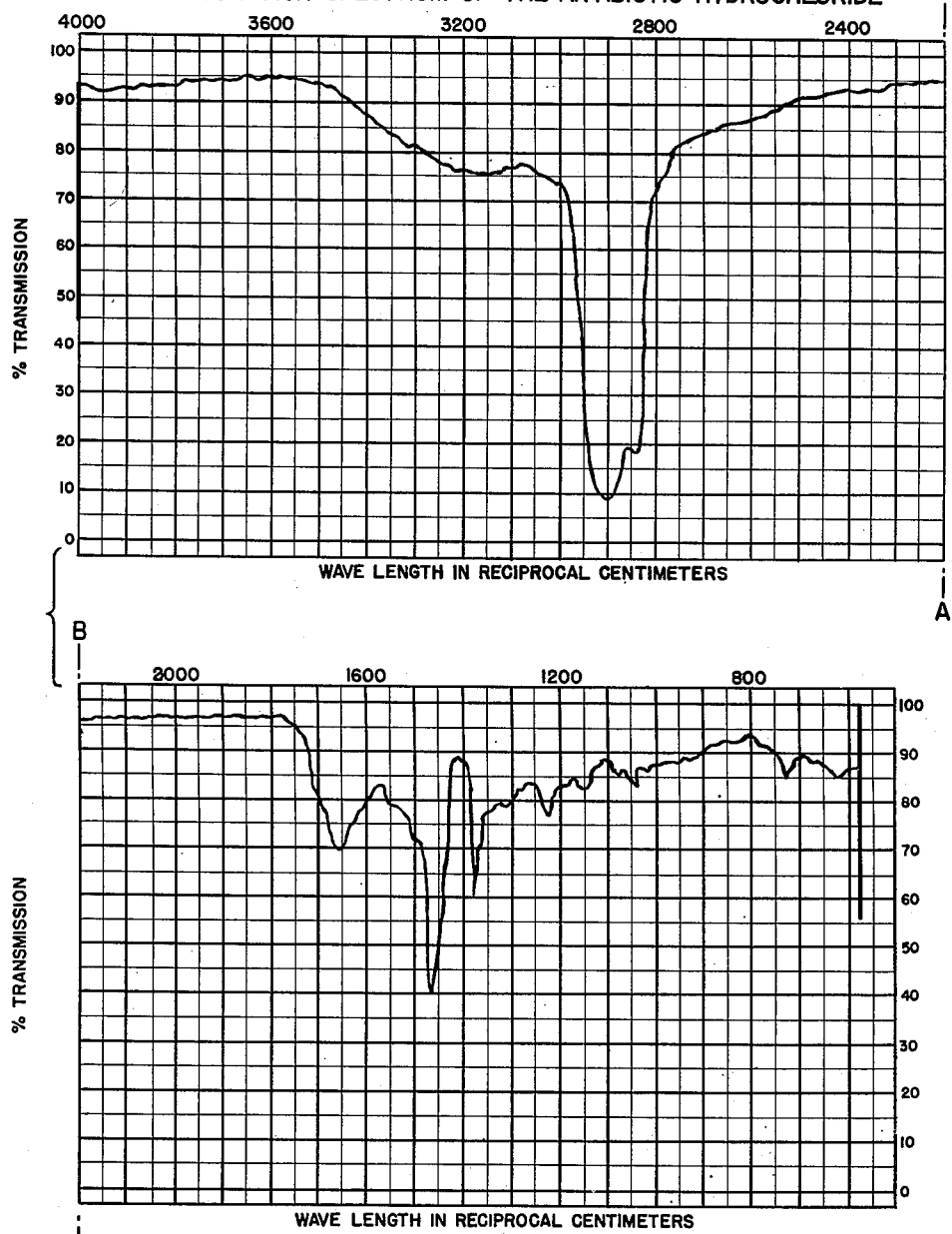

2,633,445

UNITED STATES PATENT OFFICE 2,633,445

ANTIBIOTIC AND METHOD OF PREPARING SAME

William S. Marsh, New Brunswick, Rudolf L. Mayer, Summit, Robert P. Mull, East Orange, Caesar R. Scholz, Summit, and Robert W. Townley, Chatham, N. J., assignors to Ciba Pharmaceutical Products, Incorporated, Summit, N. J., a corporation of New Jersey Application December 16, 1947, Serial No. 792,102

10 Claims. (Cl. 167—65)

This invention relates to a new antibiotic agent obtained from a species of Actinomyces and to the preparation of the acid antibiotic agent.

The new antibiotic agent may be obtained from *Actinomyces vinaceus*, a new species isolated from soil and differing morphologically and by biochemical activities from known antibiotic-producing actinomyces species, namely, *Actinomyces antibioticus*, *Actinomyces lavendulae* and *Actinomyces griseus* as shown in Table I:

TABLE I

| Species | Morphology [1] Growth on Citrate-Glycerol Agar | Biochemical Activities [1] | | |
| --- | --- | --- | --- | --- |
| | | Pigment Production | Proteolytic Action | Diastatic Action |
| *Actinomyces griseus* | Grey-white rough elevated growth. Reverse light brown. | None | Strong | Strong. |
| *Actinomyces lavendulae* | Rose colored rough growth. Reverse dark brown. | Brown Pigment. | Moderate | Do. |
| *Actinomyces antibioticus* | Yellow grey wrinkled growth. Reverse yellow-grey. | Brown-black Pigment. | Strong | Weak. |
| *Actinomyces vinaceus* | Olive grey rough elevated growth. Reverse dark red. | Red-blue Pigment. | do | Do. |

[1] According to classification methods recommended by Waksman, "Principles of Soil Microbiology," page 279, 2nd edition.

A culture of the living *Actinomyces vinaceus* has been deposited with the Fermentation Division of the Northern Regional Research Laboratory at Peoria, Illinois, and has been added to its permanent collection of microorganisms as NRRL-2285.

The antibiotic may be produced by cultivating the actinomycete in a medium containing suitable carbon and nitrogen sources such as carbohydrates, as for example dextrose, sucrose or lactose, glycerol, peptone, hydrolyzed casein, sodium nitrate, etc., as well as further inorganic salts such as potassium, magnesium and ferrous chlorides, sulfates and phosphates. After the growth stage is completed, the broth may be filtered, and the filtrate treated with an adsorbing agent such as activated carbon, kaolin or other earths. After first washing the adsorbate with alcohol if desired, the active material may be eluted with an alcoholic eluant such as acidified alcohols, for example methanolic hydrochloric acid, or blends of alcohols with other solvents such as for example dimethyl carbonate-methanol, benzene-ethanol, chloroform-methanol, etc. The antibiotic agent may be precipitated from the eluate with a diluent which is miscible with the aforementioned eluant, for example ether, petroleum ether, pentane, hexane, etc. The product thus obtained, containing the elements carbon, hydrogen, nitrogen and oxygen, is of high molecular weight and is highly active in vitro against strains of *Mycobacterium tuberculosis* var. *hominis* H37Rv (Mycobacterium strain A. T. C. C. 607), *Mycobacterium ranae*, *Bacillus mycoides*, *Staphylococcus aureus*, *Staphylococcus aureus* (streptomycin - resistant), *Escherichio coli*, *Proteus vulgaris*, *Diplococcus pneumoniae*, *Klebsiella pneumoniae* and *Bacillus subtilis* and of lesser activity against strains of *Streptococcus fecalis*, Bodenheimer's bacillus, *Pseudomonas aeruginosa*, *Shigella paradysenteriae* and *Salmonella schottmuelleri*, and shows activity in vivo against inter alia strains of *Staphylococcus aureus* and *Escherichia coli*. In aqueous solution, it exhibits absorption bands in the ultra-violet region of the spectrum having maxima at about 268 m$\mu$ at pH 1 and pH 7 and 281 m$\mu$ at pH 14 and having minima at about 226–228 m$\mu$ at pH 1 and pH 7 and at 240 m$\mu$ at pH 14. In the form of the hydrochloride, it exhibits characteristic absorption bands in the infra-red region of the spectrum when suspended in solid form in a hydrocarbon oil (Nujol) at the following frequencies expressed in reciprocal centimers: 3200 (broad band) 2908, 2845, 1660, 1495 (shoulder) 1465, 1380, 1230, 1155, 1050 and 720.

The accompanying drawing shows the infrared absorption curve with the aforementioned characteristic bands. Fig. 1 shows the portion of the curve for the range of frequencies between about 600 and 4000 reciprocal centimeters, and the curve is broken into two fragments which join at section lines A—A and B—B, the lower curve fragment showing the portion of the curve for the range of frequencies between about 600 and 2200 reciprocal centimeters. The frequencies are indicated at the top of each curve. The vertical series of members (0 to 100) designates "percentage transmission."

For further purification, the material may be subjected to chromatographic procedures using, for example, alcoholic solutions over alumina. After evaporating the solvent, the product is obtained in a crystalline form which may be recrystallized.

A very important feature of the new antibiotic of the present invention is that attempts to render organisms resistant to its action have been unsuccessful, in contrast to streptomycin [Waksman et al., Proc. Nat'l Acad. Sci. 31:157 (1945)] and to other antibiotics [McKee et al., J. Bact. 47:187 (1944); Eisman et al., Sci. 103:673-74 (1946)], to which organisms can be made resistant. The new agent according to the present invention is thus useful for the treatment of infections, and especially for those wherein the causative organism has developed resistance to other antibiotic agents, and is also suitable for use together with other antibacterial agents in order to reduce the danger of developing resistant bacterial forms. This characteristic of the new antibiotic is illustrated by the following:

Two strains of Staphylococcus aureus (American type culture collection No. 6538 and Food and Drug Administration No. 209) normally sensitive to the action of streptomycin were made resistant to this antibiotic by serial transfers of these organisms in nutrient broth containing maximal tolerated amounts of the antibiotic. By this procedure, the organisms which originally were capable of growing in the presence of two micrograms, but not four micrograms of streptomycin per milliliter (350 units per milligram purity) were able to grow in a concentration of at least 125 micrograms per milliliter of culture medium. This is shown in Table II:

TABLE II

*Action of streptomycin on streptomycin-resistant strains of* Staphylococcus aureus

| Staphylococcus aureus Strains | Streptomycin (350 units/milligram), Micrograms/ml. Culture Medium | | | | | | | |
|---|---|---|---|---|---|---|---|---|
| | 125 | 63 | 32 | 16 | 8 | 4 | 2 | Control |
| Resistant F. D. A. No. 209 | [1]++ | ++ | ++ | ++ | ++ | ++ | ++ | ++ |
| Resistant A. T. C. C. No. 6538 | ++ | ++ | ++ | ++ | ++ | ++ | ++ | ++ |
| Sensitive F. D. A. No. 209 | 0 | 0 | 0 | 0 | 0 | 0 | ++ | ++ |
| Sensitive A. T. C. C. No. 6538 | 0 | 0 | 0 | 0 | 0 | 0 | ++ | ++ |

[1] ++ denotes growth.
0 denotes no growth.

When the two streptomycin-resistant strains of *Staphylococcus aureus* were tested against the sterile broth filtrates containing the active principle of *Actinomyces vinaceus*, no resistance to this antibiotic was found. This is indicated in Table III:

TABLE III

*Action of* Actinomyces vinaceus *filtrate on Streptomycin-resistant strains of* Staphylococcus aureus

| Staphyloccus aureus Strains | Broth Filtrate Dilutions | | | | | | |
|---|---|---|---|---|---|---|---|
| | 1:10 | 1:20 | 1:40 | 1:80 | 1:160 | 1:320 | Control |
| Streptomycin-resistant F. D. A. No. 209 | 0 | 0 | 0 | 0 | + | ++ | ++ |
| Streptomycin-resistant A. T. C. C. No. 6538 | 0 | 0 | 0 | 0 | 0 | + | ++ |
| Sensitive F. D. A. No. 209 | 0 | 0 | 0 | 0 | ± | ++ | ++ |
| Sensitive A. T. C. C. No. 6538 | 0 | 0 | + | + | + | ++ | ++ |

The following examples illustrate the invention.

EXAMPLE 1

*Preparation of inoculum*

Spores formed during growth of *Actinomyces vinaceus* carried on a modified Czapek-Dox agar of the following composition:

| | Grams |
|---|---|
| Dextrose | 40 |
| $NaNO_3$ | 3.0 |
| $KH_2PO_4$ | 1.0 |
| $MgSO_4 \cdot 7H_2O$ | 0.5 |
| KCl | 0.5 |
| $FeSO_4$ | 0.01 |
| Yeast extract | 1.0 |
| Agar | 15 |

Tap water to make 1000 ml.

are transferred to a small volume (5 ml.) of sterile distilled water, shaken with sterile glass beads, and the resulting suspension, after large particles are allowed to settle out, is used to inoculate a number of 1 liter Erlenmeyer flasks, each containing 125 ml. of hardened modified Czapek-Dox agar. These flasks are incubated at 28° C. for 7–10 days until an evenly heavily sporulated growth had developed. The spores are collected and suspended in 100 ml. of sterile distilled water. The resulting suspension is filtered with aseptic precautions through sterile glass wool. This spore suspension is used for inoculating the large bottles of medium used for production.

Production of the antibiotic

A medium of the following composition:

| | Grams/liter |
|---|---|
| Dextrose | 10 |
| Peptone (Bacto) | 5.0 |
| Beef extract (Difco) | 5.0 |
| NaCl | 5.0 |
| Tap water to volume. | | is prepared and distributed in two one-quart bottles (350 ml. per bottle) and autoclaved at 10 lbs. steam pressure for 40 minutes. The bottles are inoculated, shaken well and incubated at 25–28° C. After five days' incubation, slight surface growth of a grey red-blue color has developed. At this time, each bottle is thoroughly shaken. The bottles are incubated for a total of 25–30 days, assaying the broth at intervals. When a maximum titer of activity against *Mycobacterium tuberculosis* has been reached on a pooled sample taken from a number of bottles at random, and when the filtrate has a pH over 7.8, the Actinomyces growth is filtered from the broth and the filtrate used for subsequent chemical extraction and purification.

Typical assay results by the plate method of the filtrate at this point are:

| Stationary Culture | Highest Dilution Resulting in Complete Inhibition Against— | | |
|---|---|---|---|
| | Staph. aureus No. 209 | E. coli No. 8208 | Myco. tb. No. 607 |
| *Act. vinaceus* filtrate | 1:12 | 1:3 | 1:150 |
| *Act. griseus* filtrate | 1:20 | 1:40 | 1:75 |
| *Act. lavendulae* | 1:40 | 1:75 | <1:10 |
| *Act. antibioticus* | 1:400 | 0 | 0 |

Extraction of the active material

To 80 liters of active broth, 800 grams of activated carbon (Norit SG–2) are added and stirred vigorously for 6 hours. The adsorbate is then filtered from the broth and stored at —5° C. until such time as it is desired to process it further.

10 grams of this activated carbon adsorbate are shaken for two hours in a shaking machine with 100 ml. of dimethyl carbonate-methanol blend (3:7 by volume). The eluate is filtered from the activated carbon and an equal volume of diethyl ether added which causes the precipitation of a greyish-white material that after drying at room temperature in a vacuum desiccator weighs 250 mgm.

Activity

| Organism | Partial Inhibition, $\gamma$ per ml. | Complete Inhibition, $\gamma$ per ml. |
|---|---|---|
| *Staphylococcus aureus* | 100–200 | 400–600 |
| *E. coli* | 100–200 | >600 |
| *Mycobacterium tuberculosis* | <10 | 20–40 |

EXAMPLE 2

The procedure according to Example 1 is followed up to and inclinding the treatment of the active broth with activated carbon.

After filtering the activated carbon adsorbate from the broth, 830 grams of wet activated carbon adsorbate (representing 52 liters of broth) are stirred for one hour each with four successive portions (1000, 750, 500 and 500 ml.) of methanol. The methanol eluate is discarded. The adsorbate is then stirred successively with 2400, 1800 and 1500 ml. portions of 0.1 N hydrogen chloride in anhydrous methanol. The acid eluates are combined and agitated for 15 minutes with half the volume of petroleum ether (boiling point range 30–60° C.) whereupon a somewhat greyish friable precipitate (isolate I) is obtained which weighs 3.65 grams after drying at room temperature in a vacuum desiccator. Further addition of petroleum ether gives no further precipitate.

Activity

| Organism | Partial Inhibition, $\gamma$ per ml. | Complete Inhibition, $\gamma$ per ml. |
|---|---|---|
| *Staphylococcus aureus* No. 209 | 24–32 | 40–60 |
| *E. coli* | 32–40 | 80–160 |
| *Mycobacterium tuberculosis* | | <4 |

60 grams of the above active material (isolate I) is dissolved in 1800 ml. of 80% methanol and passed through a column of 1200 grams of hydrochloric acid-treated alumina. For elution, 80% methanol is passed through the column. The first 400 ml. are discarded. The next 2400 ml. of eluate are evaporated to dryness at 40–45° C. in vacuo, yielding 18 grams of active material. The chromatographic process is repeated using 25 grams of once-chromatographed material dissolved in 2400 ml. of 80% methanol which is passed through a column of 750 grams of alumina. Elution is carried out with 80% methanol as before. The first 300 ml. are discarded. The next 2500 ml. are evaporated to dryness in vacuo at 40–45° C. to give 22.7 grams of active material.

2.5 grams of twice-chromatographed material are ground to a fine powder and dissolved in 500 ml. of absolute methanol at 55–60° C. The solution is filtered and the filtrate allowed to stand overnight at room temperature in a closed vessel. The crystalline product which forms is filtered off and dried. 1.12 grams of active material in the form of the hydrochloride are obtained; melting point 248° C. (decomposition);

$$E_{1\,cm.}^{1\%} = 328 \text{ at } 267 m\mu; [\alpha]_D = -33.5°$$

The product forms a crystalline picrate from an alcoholic solution; melting point 215° C. (decomposition).

The product is active against *Mycobacterium tuberculosis* (A. T. T. C. No. 607) at <$1\gamma$/ml. It is soluble in water, slightly soluble in low molecular weight alcohols, generally insoluble in other common organic solvents, and is not distributed from neutral acid or alkaline solutions into ordinary organic solvents such as chloroform, ether, benzene, ethyl acetate, butyl alcohol, dibutyl ether and isopropyl ketone.

Aqueous solutions are stable at room temperature for several days and at 100° C. for at least 10 minutes. In acid solution at 100° C., the substance shows slight loss of activity while alkaline solutions at 100° C. show increasing loss with rise of pH.

EXAMPLE 3

10 liters of broth having the composition:

| | Grams |
|---|---|
| Peptone | 10 |
| Beef extract | 5 |
| Dextrose | 5 |
| Sodium chloride | 5 |
| Silicone antifoaming agent | 10 |
| Distilled water to make 1000 ml. | | are placed in a 22-liter round bottom flask, and are autoclaved for 30 minutes at 15 pounds' steam pressure. The medium is then inoculated with 50 ml. for a spore suspension of *Actinomyces vinaceus*, and aerated for 120 hours at a temperature of 26° C. while passing sterile air through at 500 ml. per liter of medium per minute. The resulting broth inhibits the growth of *Mycobacterium tuberculosis* (strain A. T. T. C. No. 603) at a dilution of 1:190. After filtration, the broth may be worked up as described previously in Example 1 or Example 2.

The present application is in part a continuation of the copending application Serial No. 722,462, filed January 16, 1947, now abandoned.

Having thus described the invention, what is claimed is:

1. A member of the class consisting of an antibiotic agent and its salts with acids, said member exerting an inhibiting action on the growth of *Mycobacterium tuberculosis* var. *hominis*, *Mycobacterium ranae*, *Bacillus mycoides*, *Staphylococcus aureus*, *Escherichia coli*, *Proteus vulgaris*, *Diplococcus pneumoniae*, *Klebsiella pneumoniae* and *Bacillus subtilis* and a lesser inhibiting action on the growth of *Streptococcus fecalis*, Bodenheimer's bacillus, *Pseudomonas aeruginosa*, *Shigella paradysenteriae* and *Salmonella schottmuelleri*, said antibiotic agent consisting of the elements carbon, hydrogen, nitrogen and oxygen, and (a) forming salts with acids, (b) in the form of the hydrochloride being soluble in water, slightly soluble in low molecular weight alcohols and generally insoluble in other common organic solvents, (c) in aqueous solution exhibiting absorption bands in the ultra-violet region of the spectrum having maxima at about 268 m$\mu$ at pH 1 and pH 7 and at 281 m$\mu$ at pH 14 and having minima at about 226–228 m$\mu$ at pH 1 and pH 7 and at 240 m$\mu$ at pH 14, and (d) in the form of the hydrochloride exhibiting absorption bands in the infra-red region of the spectrum when suspended in solid form in a hydrocarbon oil, at the following frequencies, expressed in reciprocal centimeters: 3200 (broad band), 2908, 2845, 1660, 1495 (shoulder), 1465, 1380, 1230, 1155, 1050 and 720.

2. An antibiotic agent exerting an inhibiting action on the growth of *Mycobacterium tuberculosis* var. *hominis*, *Mycobacterium ranae*, *Bacillus mycoides*, *Staphylococcus aureus*, *Escherichia coli*, *Proteus vulgaris*, *Diplococcus pneumoniae*, *Klebsiella pneumoniae* and *Bacillus subtilis* and a lesser inhibiting action on the growth of *Streptoccoccus fecalis*, Bodenheimer's bacillus, *Pseudomonas aeruginosa*, *Shigella paradysenteriae* and *Salmonella schottmuelleri*, said antibiotic agent consisting of the elements carbon, hydrogen, nitrogen and oxygen, and (a) forming salts with acids, (b) in the form of the hydrochloride being soluble in water, slightly soluble in low molecular weight alcohols and generally insoluble in other common organic solvents, (c) in aqueous solution exhibiting absorption bands in the ultra-violet region of the spectrum having maxima at about 268 m$\mu$ at pH 1 and pH 7 and at 281 m$\mu$ at pH 14 and having minima at about 226–228 m$\mu$ at pH 1 and pH 7 and at 240 m$\mu$ at pH 14, and (d) in the form of the hydrochloride exhibiting absorption bands in the infra-red region of the spectrum when suspended in solid form in a hydrocarbon oil, at the following frequencies, expressed in reciprocal centimeters: 3200 (broad band), 2908, 2845, 1660, 1495 (shoulder), 1465, 1380, 1230, 1155, 1050 and 720.

3. The hydrochloric acid salt of the antibiotic of claim 2.

4. An aqueous solution containing the antibiotic of claim 2.

5. A process for producing the antibiotic agent of claim 2 which comprises fermenting an aqueous nutrient medium containing a carbon and nitrogen source material under aerobic conditions with *Actinomyces vinaceus* until a substantial antibiotic activity is imparted thereto.

6. A process for producing the antibiotic agent of claim 2 which comprises fermenting an aqueous nutrient medium containing a carbon and nitrogen source material under aerobic conditions with *Actinomyces vinaceus* until a substantial antibiotic activity is imparted thereto and recovering said antibiotic by adsorption on an adsorbing agent.

7. A process for producing the antibiotic agent of claim 2 which comprises fermenting an aqueous nutrient medium containing a carbon and nitrogen source material under aerobic conditions with *Actinomyces vinaceus* until a substantial antibiotic activity is imparted thereto, recovering said antibiotic by adsorption on an adsorbing agent, eluting the antibiotic adsorbate from said adsorbent with a liquid to extract said antibiotic and recovering the antibiotic in purified form from the extract by adding a liquid from the group consisting of diethyl ether and petroleum ether to the extract to precipitate the antibiotic.

8. A process for producing the antibiotic agent of claim 2 which comprises fermenting an aqueous nutrient medium containing a carbon and nitrogen source material under aerobic conditions with *Actinomyces vinaceus* until a substantial antibiotic activity is imparted thereto, recovering said antibiotic by adsorption on an adsorbing agent, eluting the antibiotic adsorbate from said adsorbent with methanol and dimethyl carbonate to extract the antibiotic and recovering the antibiotic in purified form from the extract by adding diethyl ether to the eluate to precipitate the antibiotic.

9. A process for producing the antibiotic agent of claim 2 which comprises fermenting an aqueous nutrient medium containing a carbon and nitrogen source material under aerobic conditions with *Actinomyces vinaceus* until a substantial antibiotic activity is imparted thereto, recovering said antibiotic by adsorption on an adsorbing agent, eluting the antibiotic adsorbate from said adsorbent with methanol acidified with hydrogen chloride to extract the antibiotic and recovering the antibiotic in purified form from the extract by adding petroleum ether to precipitate the antibiotic.

10. The process which comprises treating an aqueous culture filtrate containing an antibiotic agent exerting an inhibiting action on the growth of *Mycobacterium tuberculosis* var. *hominis*, *Mycobacterium ranae*, *Bacillus mycoides*, *staphylococcus aureus*, *Escherichia coli*, *Proteus vulgaris*, *Diplococcus pneumoniae*, *Klebsiella pneumoniae* and *Bacillus subtilis* and a lesser inhibiting action on the growth of *Streptococcus fecalis*, Bodenheimer's bacillus, *Pseudomonas aeruginosa*, *Shigella paradysenteriae* and *Salmonella schottmuelleri*, said antibiotic agent consisting of the elements carbon, hydrogen, nitrogen and oxygen, and (a) forming salts with acids, (b) in the form of the hydrochloride being soluble in water, slightly soluble in low molecular weight alcohols and generally insoluble in other common organic solvents, (c) in aqueous solution exhibiting adsorption bands in the ultra-violet region of the spectrum having maxima at about 268 m$\mu$ at pH 1 and pH 7 and at 281 m$\mu$ at pH 14 and having minima at about 226–228 m$\mu$ at pH 1 and pH 7 and at 240 m$\mu$ at pH 14, and (d) in the form of the hydrochloride exhibiting absorption bands in the infrared region of the spectrum when suspended in solid form in a hydrocarbon oil, at the following frequencies, expressed in reciprocal centimeters: 3200 (broad band), 2908, 2845, 1660, 1495 (shoulder), 1465, 1380, 1230, 1155, 1050 and 720, with an adsorbent to adsorb said antibiotic agent, eluting the antibiotic from said adsorbent with an eluting agent, and recovering the antibiotic from the resulting eluate.

WILLIAM S. MARSH.
    RUDOLF L. MAYER.
    ROBERT P. MULL.
    CAESAR R. SCHOLZ.
    ROBERT W. TOWNLEY.

REFERENCES CITED

The following references are of record in the file of this patent:

Carter, in J. Biol. Chem., volume 160, July 3, 1945, pages 337 to 342.

Waksman et al.: J. Biol. Chem., volume 142, pages 520 to 525 (1942).

Vander Brook: J. Biol. Chem., volume 165, pages 463 to 468 (1946).

Waksman: Soil Science, volume 1, pages 110 and 111 (1916).

Cheronis: "Semimicro and Macro Organic Chemistry" (Crowell, New York, 1942); pages 26 and 27.

Waksman: J. Bact., volume 46, pages 299, 300, 308 and 309 (1943).

Chemical Abstracts, volume 39, page 1661 (1945). [Citing: Fainschmidt et al., in Biokhimiya, volume 9, pages 147 to 153 (1944).]

Peck et al.: J. Am. Chem. Soc., volume 68, pages 772 to 776 (May 1946).

Waksman: "Microbial Antagonisms and Antibiotic Substances" (The Commonwealth Fund, New York, 1945), page 110.

Quarendon: Manufacturing Chemist and Manufacturing Perfumer, volume 14, pages 251 to 254 (1943).